(12) United States Patent
Wyatt

(10) Patent No.: US 6,765,866 B1
(45) Date of Patent: Jul. 20, 2004

(54) LINK AGGREGATION

(75) Inventor: Richard M. Wyatt, Ottawa (CA)

(73) Assignee: Mosaid Technologies, Inc., Kanata (CA)

(*) Notice: Subject to any disclaimer, the term of this patent is extended or adjusted under 35 U.S.C. 154(b) by 0 days.

(21) Appl. No.: 09/516,001

(22) Filed: Feb. 29, 2000

(51) Int. Cl.[7] .................................. G01R 31/08
(52) U.S. Cl. .................................... 370/229
(58) Field of Search ........................ 370/229–230, 370/338, 351, 384, 389–398, 441, 210, 484, 342, 474, 409, 453, 238, 252, 255, 473, 429, 235; 375/114, 222, 340–344, 330, 131, 129, 128, 126, 260; 455/3.05, 3.01, 424, 342, 7, 561; 709/105, 225–229; 711/3, 118, 137

(56) References Cited

U.S. PATENT DOCUMENTS

| | | | |
|---|---|---|---|
| 5,546,379 A | | 8/1996 | Thaweethai et al. ........... 370/17 |
| 5,949,788 A | | 9/1999 | Friedman et al. ........... 370/431 |
| 6,016,310 A | * | 1/2000 | Muller et al. ............... 370/255 |
| 6,216,199 B1 | * | 4/2001 | DeKoning et al. ............. 711/3 |
| 6,496,502 B1 | * | 12/2002 | Fite, Jr. et al. ............. 370/389 |
| 6,553,028 B1 | * | 4/2003 | Tang et al. .................. 370/389 |
| 6,580,715 B1 | * | 6/2003 | Bare ........................... 370/396 |

FOREIGN PATENT DOCUMENTS

| | | |
|---|---|---|
| EP | 0649098 A2 | 4/1995 |
| EP | 0863646 A2 | 9/1998 |
| EP | 0910195 A2 | 4/1999 |
| WO | EP0 889 624 A1 | 7/1999 |
| WO | WO 99/56432 | 11/1999 |

OTHER PUBLICATIONS

Frazier, H., et al., "*Link Aggregation and Trunking*", IEEE 802 LMSC Tutorial, Montreal, PQ, Nov. 11, 1997, retrieved from the Internet <URL:http://gruoper.ieee.org/groups/802/3/trunk–study/tutorial/index.html> on May 14, 2001.

Conant, G.E., "Multilink PPP: One Big Virtual WAN Pipe", *Data Communications*, No. 13:85–90 (Sep. 21, 1995).

* cited by examiner

*Primary Examiner*—Chi Pham
*Assistant Examiner*—Prenell Jones
(74) *Attorney, Agent, or Firm*—Hamilton, Brook, Smith & Reynolds, P. C.

(57) ABSTRACT

In a switch with multiple physical links to a destination, data is forwarded to the destination by distributing received data across the physical links. A flow hash is selected for the received data's data flow dependent on a destination address and source address included in the received data. The flow hash selects one of the physical links to the destination for a data flow but potentially a different physical link for a different data flow, thereby forwarding the received data by distributing the received data across the physical links while maintaining frame ordering within a data flow.

36 Claims, 9 Drawing Sheets

| 200 | | | | | |
|---|---|---|---|---|---|
| PHYSICAL LAYER (L1) HEADER  202 | DATA LINK LAYER (L2) HEADER  204 | NETWORK LAYER (L3) HEADER  206 | TRANSPORT LAYER (L4) HEADER  208 | DATA  210 | CHECKLIST  212 |

PRIOR ART

FIG. 2A

| 204 | | | | |
|---|---|---|---|---|
| L2 DESTINATION ADDRESS (DA) (6 BYTES) 214 | L2 SOURCE ADDRESS (SA) (6 BYTES) 216 | VLAN ID (OPTIONAL) (12 BITS) | | LENGTH/ TYPE (2 BYTES) 220 |
| | | TAG PROTOCOL IDENTIFIER (TPID) 218a | TAG CONTROL INFORMATION (TCI) 218b | |

PRIOR ART

FIG. 2B

| 206 | | | |
|---|---|---|---|
| 222 VERS | 234 HLEN | 236 TOS | 228 TOTAL LENGTH |
| 230 IDENTIFICATION | | 232 FLAGS | 234 FRAGMENT OFFSET |
| 236 TTL | 240 PROTOCOL | 242 HEADER CHECKSUM | |
| 244 IP SOURCE ADDRESS | | | |
| 246 IP DESTINATION ADDRESS | | | |
| 248 OPTIONS | | | 250 PAD |

PRIOR ART

FIG. 2C

LINK AGGREGATION

BACKGROUND OF THE INVENTION

A networking switch receives data packets from a number of ingress ports connected to the switch and provides the data packets to a number of egress ports connected to the switch. The switch determines the egress port to which the data packets are provided dependent on the destination address included in the data packet.

Typically, a destination is connected through one physical link to one egress port in the switch. A data packet received at an ingress port for the destination is forwarded through the switch to the egress port. The destination may be a computer, another switch or a router.

To increase the bandwidth to a destination; that is, the number of data packets that can be forwarded through the switch to a destination, the destination may be connected to more than one egress port through multiple physical links with each physical link terminating at an egress port. The multiple physical links are members of a logical link between the switch and the destination.

Providing multiple physical links to a destination is called link aggregation or trunking. Link aggregation for IEEE 802.3 is described in tutorials published by the IEEE 802.3ad group at http://grouper.ieee.org/groups/802/3/trunk-study/tutorial.

A data packet arriving at an ingress port in the switch may be forwarded through the switch on any one of the physical links in the logical link to the destination. Thus, link bandwidth is increased because data packets for a destination are distributed amongst the physical links. To achieve maximum bandwidth utilization on the logical link, data packets to the destination must be evenly distributed amongst the physical links to the destination.

However, when distributing received data packets amongst the physical links, data packets for a data flow cannot be mis-ordered through the switch.

SUMMARY OF THE INVENTION

A switch includes a logical link connecting a destination to the switch. The logical link includes physical links. The system assumes that flow hash logic in the switch indexes a flow hash dependent on a data flow encoded in the received data. Trunk port selector logic in the switch selects a trunk port entry dependent on the flow hash. The trunk port entry selects the physical link on which to forward the received data to the destination.

The data flow is encoded in the destination and source addresses stored in a header in the received data. The source and destination addresses may be Ethernet source and destination addresses, IP source and destination addresses, UDP source and destination port addresses or TCP source and destination port addresses.

The switch includes vector combine logic which selects a port in the switch corresponding to the physical link. The port is selected dependent on a combination of a logical port forward vector and the trunk port entry.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A illustrates a prior art data packet which may be received on an ingress port connected to a switch;

FIG. 2B illustrates a prior art Ethernet Data link layer (L2) header which may be included in the data packet shown in FIG. 2A;

FIG. 2C illustrates a prior art Internet Protocol (Network layer (L3)) header which may be included in the data packet shown in FIG. 2A;

DETAILED DESCRIPTION OF THE INVENTION

A description of preferred embodiments of the invention follows.

Figure 1A:
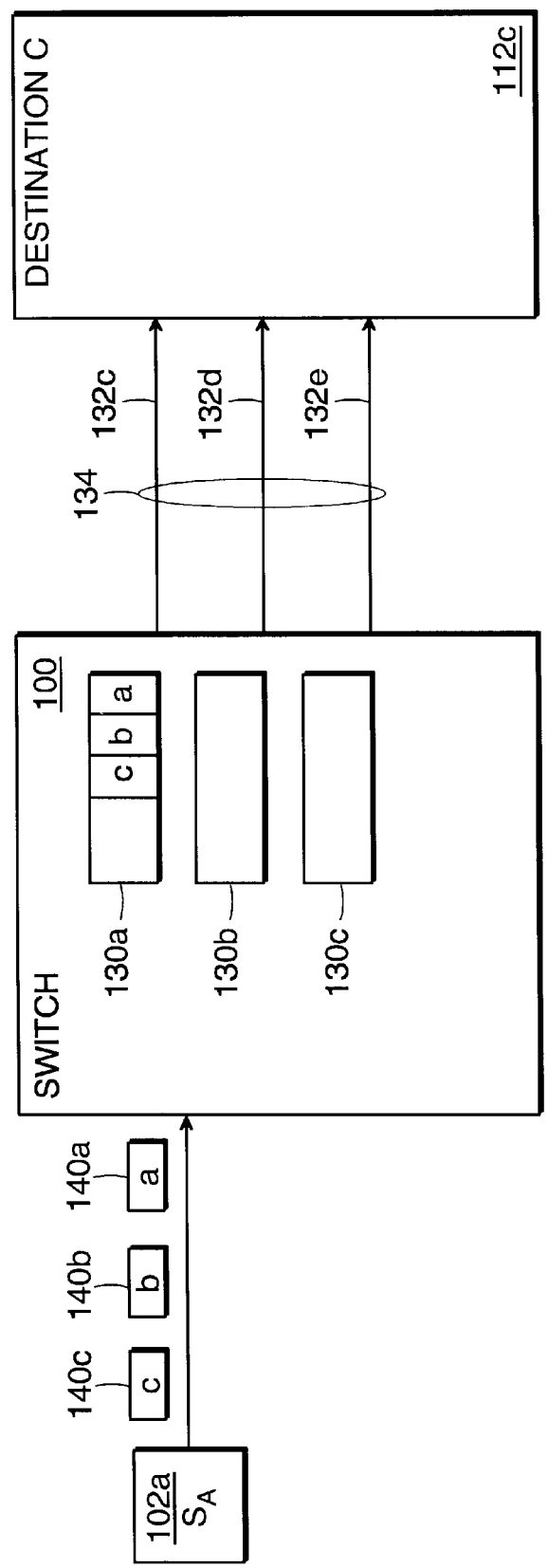
FIG. 1A illustrates a logical link connecting a destination to a switch according to the principles of the present invention.

FIG. 1A illustrates a logical link 134 connecting a destination 112c to a switch 100 according to the principles of the present invention. The logical link or trunk group 134 includes physical links 132c–e. Destination 112c is connected to the switch through physical links 132c–e. A received data packet for destination 112c may be forwarded on any one of the three physical links 132c–e to destination 112c. The switch 100 includes an egress port queue 130a–c corresponding to each physical link 132c–e in the logical link 134. The switch forwards data packets received from a source 102a to one of the egress port queues 130a–c.

The egress port queue 130a–c to which a received data packet is stored before being forwarded on the corresponding physical link 132c–e is dependent on the data flow, that is; the source address and destination address included in the data packet. By selecting a physical link dependent on a source address and destination address, data packets for the same data flow are always forwarded on the same physical link and thus are not mis-ordered in the switch.

For example, data packets 140a–c to be forwarded to destination 112c are received by the switch from source 102a. Each data packet 140a–c includes the source address for source 102*a* and the destination address for destination 112*c*. The switch determines the data flow from the source and destination addresses stored in the data packets 132*c*–*e*. As each of the data packets 140*a*–*c* is received and stored in memory in the switch and the address of the data packet in memory is stored in the order that it is received in egress port queue 130*a*. Each of data packets 140*a*–*c* is forwarded on physical link 132*c* to destination 112*c*. Thus, data packets 140*a*–*c* for the data flow from source 102*a* to destination 112*c* are transmitted to destination 112 in the order that they are received by the switch 100.

Figure 1B:
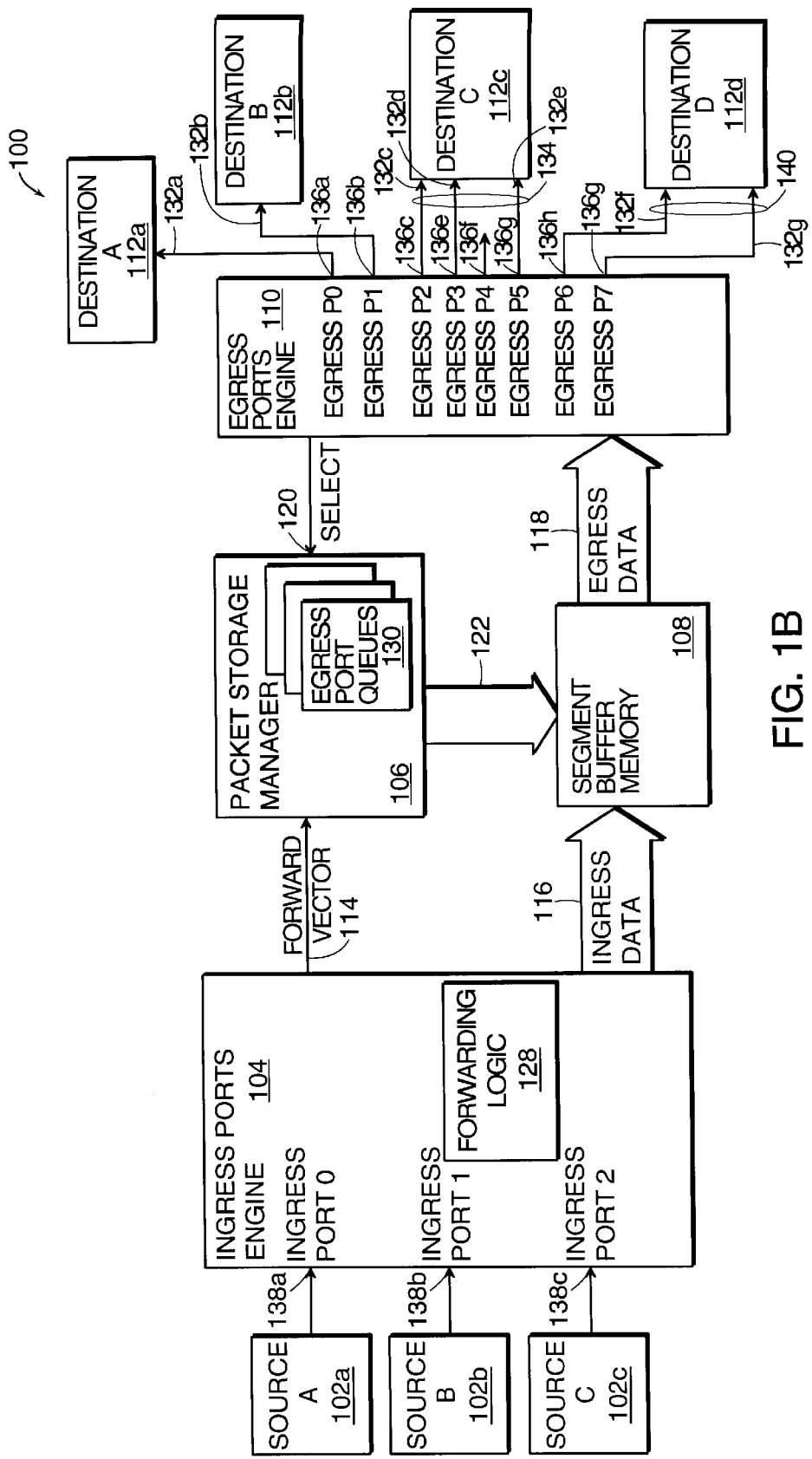
FIG. 1B illustrates a switch shown in FIG. 1A including forwarding logic for forwarding data packets received at an ingress port on one of a plurality of links in the logical link connecting the destination to the switch.

FIG. 1B illustrates the switch 100 shown in FIG. 1A including forwarding logic 128 for forwarding data packets received at an ingress port on one of a plurality of physical links 132*c*–*e*. The switch 100 includes an ingress ports engine 104, a packet storage manger 106, a segment buffer memory 108 and an egress ports engine 110. The physical links 132*c*–*e* are members of a logical link 134 connecting destination 112*c* to the switch 100. Physical links 132*f*–*g* are members of logical link 140 connecting destination 112*d* to the switch 100. A single physical link 132*a* connects destination 112*a* to the switch 100 and a single physical link 132*b* connects destination 112*b* to the switch 100. Thus, if all physical links are the same speed, logical link 140 provides double the bandwidth to destination 112*d* as the single physical link 132*a* to destination 112*a* and logical link 134 provides three times the bandwidth destination 112*a* as single physical link 132*b* to destination 112*b*.

The switch 100 may include any combination of single physical links and logical links to a destination 112. A logical link may include any number of physical links. The physical links in a logical link may connect non-sequential ports to a destination 112, for example, logical link 134 connects non-sequential egress ports (egress port 2 136*c*, egress port 3 136*d*, and egress port 5 136*f*) to destination 112*c*. Alternatively, a logical link may connect consecutive ports to a destination, for example, logical link 140 connects consecutive egress ports (egress port 6 136*g*, egress port 7 136*h*) to destination 112*d*.

Thus, all egress ports 136*a*–*h* may be members of the same logical link, each egress port 136*a*–*h* may be a single physical link or the egress ports 136*a*–*h* may be configured in a combination of logical links and single physical links to destinations 112*a*–*d*.

The members of a logical link are not limited to physical links 132*a*–*h* of the same speed. For example, a 1 Gigabit Ethernet egress port may be a member of the same logical links as 100 Mbits Ethernet egress port.

A data packet received at an ingress port 138*a*–*c* from a source 102*a*–*c* is forwarded to one or more egress ports 136*a*–*h* dependent on the forward vector 114 generated by the forwarding logic 128 in the ingress ports engine 104. The forward vector 114 is dependent on a logical port forward vector stored in a forward database implemented in the forwarding logic 128.

The packet storage manager 106 stores the ingress data 116 received in the data packet in the segment buffer memory 108. The packet storage manager 106 also stores the address of the received ingress data 116 in the segment buffer memory 108 in one or more egress port queues 130 dependent on the state of the forward vector 114. The packet storage manager 106 is described in co-pending U.S. patent application Ser. No. 09/386,589 filed on Aug. 31, 1999 entitled "Method and Apparatus for an Interleaved Non-Blocking Packet Buffer," by David A. Brown, the entire teachings of which are incorporated herein by reference in its entirety.

The egress ports engine 110 through a select signal 120 selects an egress port queue 130 from which to forward the address of received ingress data 116 on address 122 to the segment buffer memory 108. The ingress data 116 stored in segment buffer memory 108 is forwarded on egress data 118 to an egress port 136*a*–*h*. The egress port 136*a*–*h* to which the egress data 118 is forwarded is dependent on the forward vector 114.

The forward vector 114 selects an egress port queue 130 in which to store the address in segment buffer memory 108 at which the data packet is stored. The egress ports engine 110 through the select signal 120 selects an egress port queue 130. The address 122 is forwarded to segment buffer memory 108. The egress data 118 stored at the address 122 is forwarded to the egress port engine 110 and from the egress port engine 110 to an egress port 136*a*–*h* dependent on the selected egress port queue 130.

Destination 112*c* is connected to three egress ports (port 2, port 3, port 5) 136*c*–*e* through physical links 132*c*–*e*. The physical links 132*c*–*e* are members of a logical link or trunk group 134. The members of the logical link 134 are not limited to the three egress ports 136*c*–*e* shown. The members of the logical link 134 may include any combination of egress ports 136*a*–*h* in the switch 100. The forward vector 114 includes a bit for each egress port 136*a*–*h* through which a received data packet may be forwarded. A received data packet for destination 112*c* may be forwarded on any one of the three physical links 132*c*–*e* to destination 112*c*. The forwarding logic 128 selects one of the three physical links 132*c*–*e* to destination 112*c* so that a data packet for a data flow from one source to a destination is always forwarded on the same physical link 132*c*–*e* to the destination 112*c*. For example, physical link 132*e* may be selected for forwarding all data packets received from source 102*a* to destination 112*c*.

FIG. 2A illustrates a prior art data packet 200 which may be received at an ingress port 136*a*–*c* (FIG. 1B) connected to the switch 100 (FIG. 1B). FIG. 2B illustrates a prior art Ethernet header which may be included in the data packet 200 shown in FIG. 2A. FIG. 2C illustrates a prior art Internet Protocol ("IP") header which may be included in the data packet 200 shown in FIG. 2A.

FIG. 2A shows a prior art data packet 200. The data packet 200 includes a data payload 210 and headers for networking layers 202, 204, 206, 208. Headers for four of the layers in the OSI model are shown, the physical layer (L1) header 202, the data link layer (L2) header 204, the networking layer (L3) header 206 and the transport layer (L4) header 208. For example, the data link layer (L2) header 204 may be Ethernet and the networking layer (L3) header 206 may be IP. The data packet 200 also includes a checksum 212.

FIG. 2B illustrates the format of a prior art Ethernet data link (L2) header 204. The Ethernet data link (L2) header 204 includes a device address for the destination node 104 (FIG. 1B); that is, the L2 destination address 214, and a device address for the source node 102 (FIG. 1B); that is, the L2 source address 216, an optional Virtual Local Area Network Identification ("VLAN ID") field 218 and a length/type field 220. The VLAN ID 218 includes a Tag Protocol Identifier ("TPI") field 218a and a Tag Control Information ("TCI") field 218b. The VLAN ID field 218 provides support for VLAN switching based on IEEE 802.1Q tagging and IEEE 802.ID 1988 (802.1p) priority levels.

FIG. 2C illustrates the format of a prior art IP network layer (L3) header 206. The IP network layer (L3) header 206 includes a network address for the source node 102a–c (FIG. 1B), that is the IP source address 244, and a network address for the destination node 112a–c (FIG. 1B), that is, the IP destination address 246. Other fields in the IP network layer header 206 include Version 222, HLEN 224, Type of Service ("TOS") 226, Total Length 228, Identification 230, Flags 232, Fragment Offset 234, Time to Live ("TTL") 236, Protocol field 240, Header Checksum 242, Options 248 and pad 250.

A data packet 200 (FIG. 2A) received from a source node 102a–c (FIG. 1B) at an ingress port 138a–c (FIG. 1B) is bridged to one or more egress ports 136a–h (FIG. 1B) dependent on the destination address 214 (FIG. 2B) stored in the Ethernet data link (L2) header 204 (FIG. 2A) or is routed to one or more egress ports 136a–h (FIG. 1B) dependent on the IP destination address 246 stored the IP network layer (L3) header 206.

Figure 3:
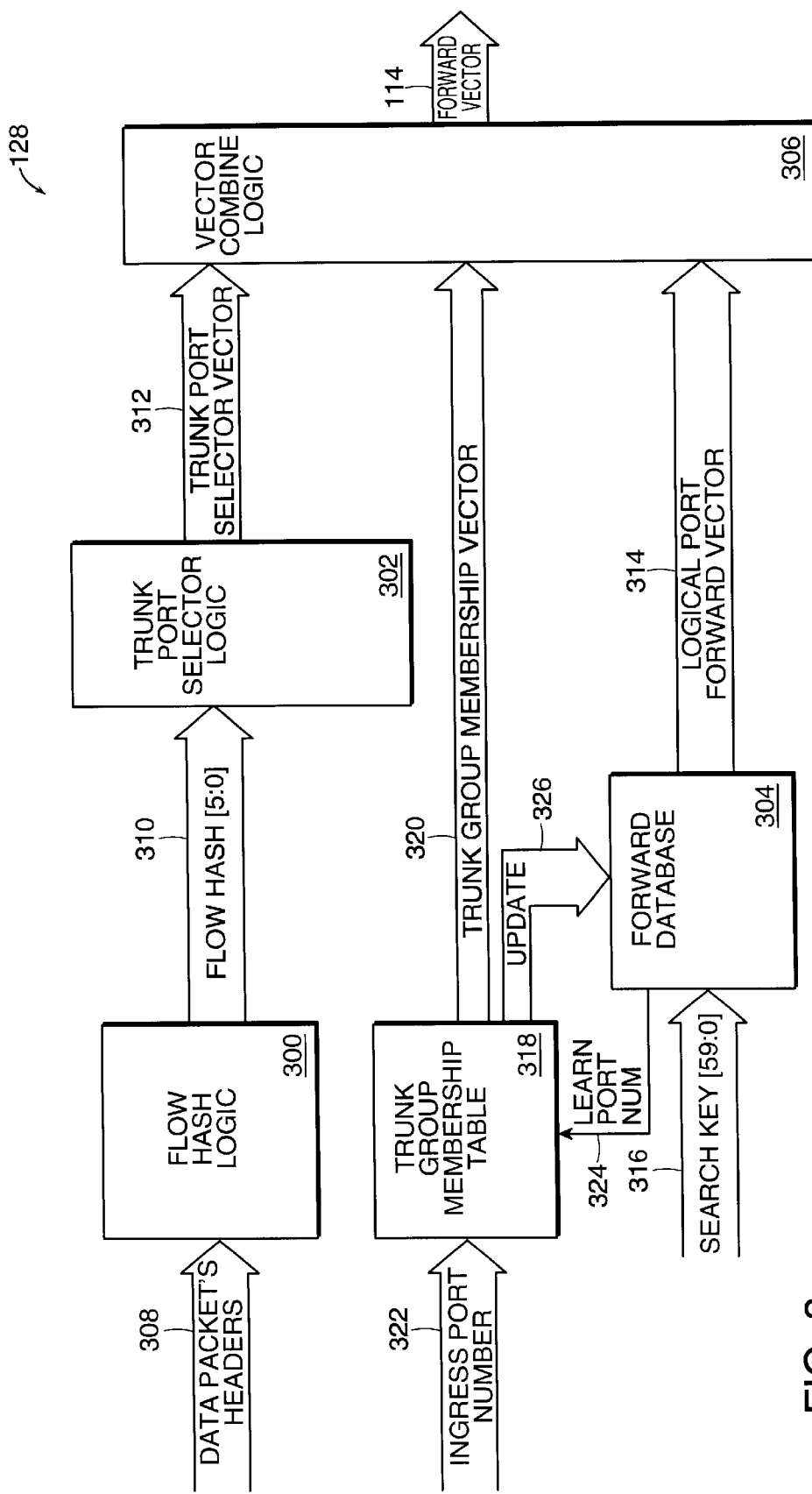
FIG. 3 illustrates the forwarding logic shown in FIG. 1B.

FIG. 3 illustrates the forwarding logic 128 shown in FIG. 1B. The forwarding logic 128 includes a forward database 304. The forward database 304 selects a logical port forward vector 314 dependent on the contents of a search key 316. The forward database 304 is described in co-pending U.S. application Ser. No. 09/409,184 filed Sep. 30, 1999 entitled "Method and Apparatus for a Four-Way Hash Table" by David A. Brown, the entire teachings of which are incorporated herein by reference in its entirety.

The logical port forward vector 314 includes an egress port bit for each egress port 136a–h (FIG. 1B) in the switch 100 (FIG. 1B). An egress port bit is set to '1' to enable forwarding to the respective egress port 136a–h (FIG. 1B) and set to '0' to disable forwarding to the respective egress port 136a–h (FIG. 1B), thereby indicating all the egress ports to which a data packet can be forwarded. Thus, in a logical port forward vector 314 for destination 112c (FIG. 1B) egress port 2, egress port 3 and egress port 5 bits are set to '1' to enable the data packet to be forwarded to egress ports 136c, 136d and 136f (FIG. 1B) connected to destination 112c (FIG. 1B).

A trunk port selector vector 312 is selected by trunk port selector logic 302 dependent on a flow hash 310 generated by the flow hash logic 300. The trunk port selector vector 312 selects one of the egress ports (port 2, port 3 or port 5) 136c–e enabled in the logical port forward vector 314, through which to forward a received data packet to destination 112c (FIG. 1B).

The trunk group membership table 318 includes a trunk group membership vector 320 for each ingress port138 (FIG. 2) in the switch 100. The trunk group membership vector 320 includes a bit for each port in the switch 100. A bit is set to '1' in the port's trunk group membership vector indicating other ports which are in the same trunk group. If an ingress port is not a member of a trunk group, the ingress port's bit is the only bit set to '1' in the trunk group membership vector.

In a switch which supports trunking, a host may send and receive data packets on any of the ports associated with the trunk on which that host resides. It is necessary to identify which ports belong to the same trunk group on which the packet was received. As a result, ingress ports are used to index the trunk group membership table in order to ensure echo suppression, that is, ensure that an incoming packet is not forwarded to the same port or other ports of that particular trunk group. For example, if ingress port 0 is a member of a trunk group consisting of ports 0, 2 and 3, an incoming data packet can not be forwarded to ports 0, 2 or 3 because they are all part of the same trunk group. The trunk group membership table 318 stores this group membership information and ensures that such echoing will not occur.

The ingress port at which a data packet is received is forwarded on ingress port number 322 to the trunk group membership table 318. The ingress port number 322 is an index to a trunk group membership vector 320 in the trunk group membership table 318. The trunk group membership vector 320 is forwarded to the vector combine logic 306.

A trunk group membership vector 320 can be used to perform hardware learning by modifying, refreshing or adding a logical port forward vector 314 in the forward database 304. A learn port number 324 is stored with each logical port forward vector 314 stored in the forward data base. The learn port number 324 identifies the ingress port at which the source address was learned. The learn port number 324 is forwarded to the trunk group membership table 318. The trunk group membership table 318 determines if the logical port forward vector for the source address is to be modified dependent on the learn port number 324. If so, the trunk group membership table forwards the updated logical port forward vector 326 to the forward database 304. The steps for determining if the logical port forward vector is to be updated are described in conjunction with FIG. 7.

The vector combine logic 306 combines the trunk port selector vector 312, the logical port forward vector 314, and the trunk group membership vector 320. The trunk port selector vector 312 provides a mask for the logical port forward vector 314, to select one of the enabled egress ports, through which to forward the received data packet to destination 112c.

A portion of the data packet's headers 308 are forwarded to the flow hash logic 300. The contents of the portion of the data packet's headers 308 is dependent on the network protocol encoded in the received data packet. If the received data packet includes a layer 3 header; for example, an IP network layer (L3) header 206 (FIG. 2C), the portion of the data packet's headers 308 includes the IP source address 244 (FIG. 2C), the IP destination address 246 (FIG. 2C), and the Protocol field 240 (FIG. 2C). If the data packet does not include a layer 3 header; for example, if the data packet is an Ethernet Protocol data packet, the portion of the data packet's headers 308 includes the L2 source address 216 (FIG. 2B) and the L2 destination address 214 (FIG. 2B). Thus, the contents of the portion of the data packet's header 308 identifies a data flow from a source 102*a–c* (FIG. 1B) to a destination 112*a–c* (FIG. 1B), so that data packets for the same flow (from a source to a destination) are forwarded through the same egress port 136*a–h* (FIG. 1B) on the same physical link 132*c–e* (FIG. 1B) to the destination 112*c*.

Figure 4:
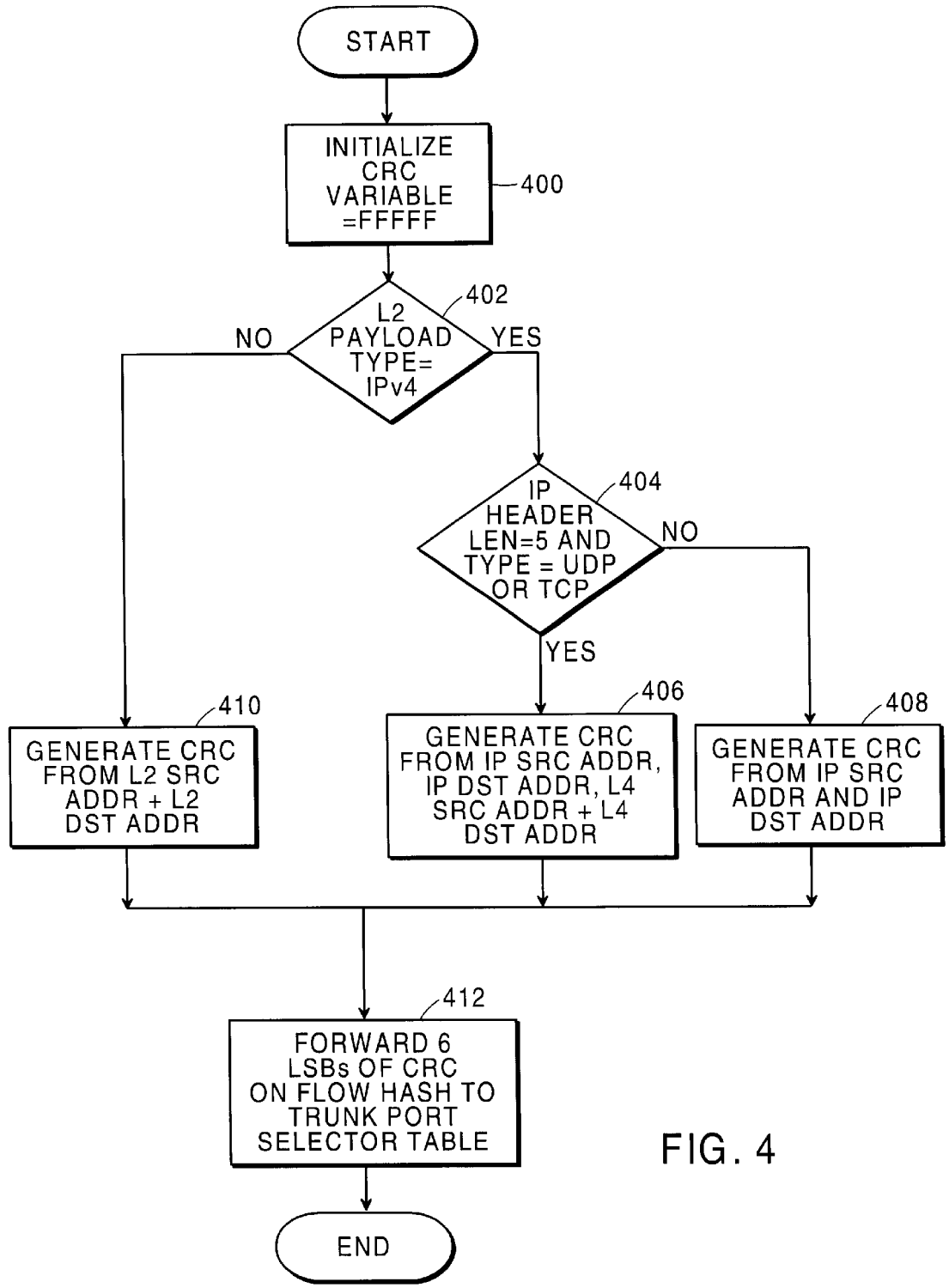
FIG. 4 is a flow diagram of the functions performed in the flow hash logic shown in FIG. 3.

FIG. 4 is a flow diagram of the functions performed in the flow hash logic 300 shown in FIG. 3. The flow hash logic 300 (FIG. 3) generates a Cyclic Redundancy Check ("CRC") on the contents of a portion of the data packet's headers 308 (FIG. 1B). The contents of the portion of the data packet's headers 308 (FIG. 3) is selected from the data packet's headers and forwarded to the flow hash logic 300 (FIG. 3). The flow diagram is described in conjunction with FIG. 3.

At step 400, a CRC variable is initialized to an invalid value before the CRC is generated. The invalid value may be generated by setting all bits in the CRC variable to '1'. Processing continues with step 402.

At step 402, the flow hash logic 300 (FIG. 3) examines the contents of the L2 length/type field 220 (FIG. 2B) in the data link (L2) header 204 (FIG. 2B). If the length/type field 220 (FIG. 2B) is Internet Protocol Version 4 ("IPv4"), the data packet includes an IP network layer (L3) header 206 (FIG. 2C), and processing continues with step 404. If not, processing continues with step 410.

At step 404, the flow hash logic 300 (FIG. 3) examines the length field 228 (FIG. 2C) and the protocol field 240 in the IP network layer (L3) header 206 (FIG. 2C). If the length field 228 (FIG. 2C) contents are 'five' and the protocol field 240 stores User Datagram Protocol ("UDP") or Transport Control Protocol ("TCP"), processing continues with step 406. If not, processing continues with step 408.

At step 406, the flow hash logic 300 (FIG. 3) generates a CRC using the contents of the IP source address field 244 (FIG. 2C), the IP destination address field 246 (FIG. 2C) in the IP network layer (L3) header 206 (FIG. 2C), the contents of the L4 source port address field (not shown) and the contents of L4 destination port address field (not shown) in the transport layer (L4) header 208 (FIG. 2A) included in the data packet's headers. After the CRC is generated and stored in the CRC variable, processing continues with step 412.

At step 408, the flow hash logic 300 (FIG. 3) generates a CRC using the contents of the IP source address field 244 (FIG. 2C) and the IP destination address 246 (FIG. 2C) field in the IP network layer (L3) header 206 (FIG. 2C) included in the data packet's headers. After the CRC is generated and stored in the CRC variable, processing continues with step 412.

At step 410, the flow hash logic 300 (FIG. 3) generates a CRC using the contents of the L2 source address field 216 (FIG. 2B) and the L2 destination address field 214 (FIG. 2B) in the data link layer (L2) header 206 (FIG. 2B) included in the data packet's headers. After the CRC is generated and stored in the CRC variable, processing continues with step 412.

At step 412, the flow hash logic 300 (FIG. 3) selects the Least Significant Bits ("LSBs") of the stored CRC variable as flow hash bits 310 (FIG. 3). The flow hash bits 310 (FIG. 3) are forwarded to the trunk port selector table 302 (FIG. 3). Six flow hash bits 310 allow the selection of one of the sixty-four trunk port selector table entries stored in the truck port selector table 302 (FIG. 3).

By generating flow hash bits 310 dependent on the source and destination addresses included in the data packet's headers, data packets for the same flow (from a source 102 (FIG. 1B) to a destination 112 (FIG. 1B)) select the same trunk port selector table entry in the trunk port selector table 302 (FIG. 3). Also, by selecting a trunk port selector table entry dependent on a source address and a destination address, data flows are distributed amongst a plurality of physical links 132*c–e* (FIG. 1B) connected to a destination 112*c* (FIG. 1B).

Figure 5:
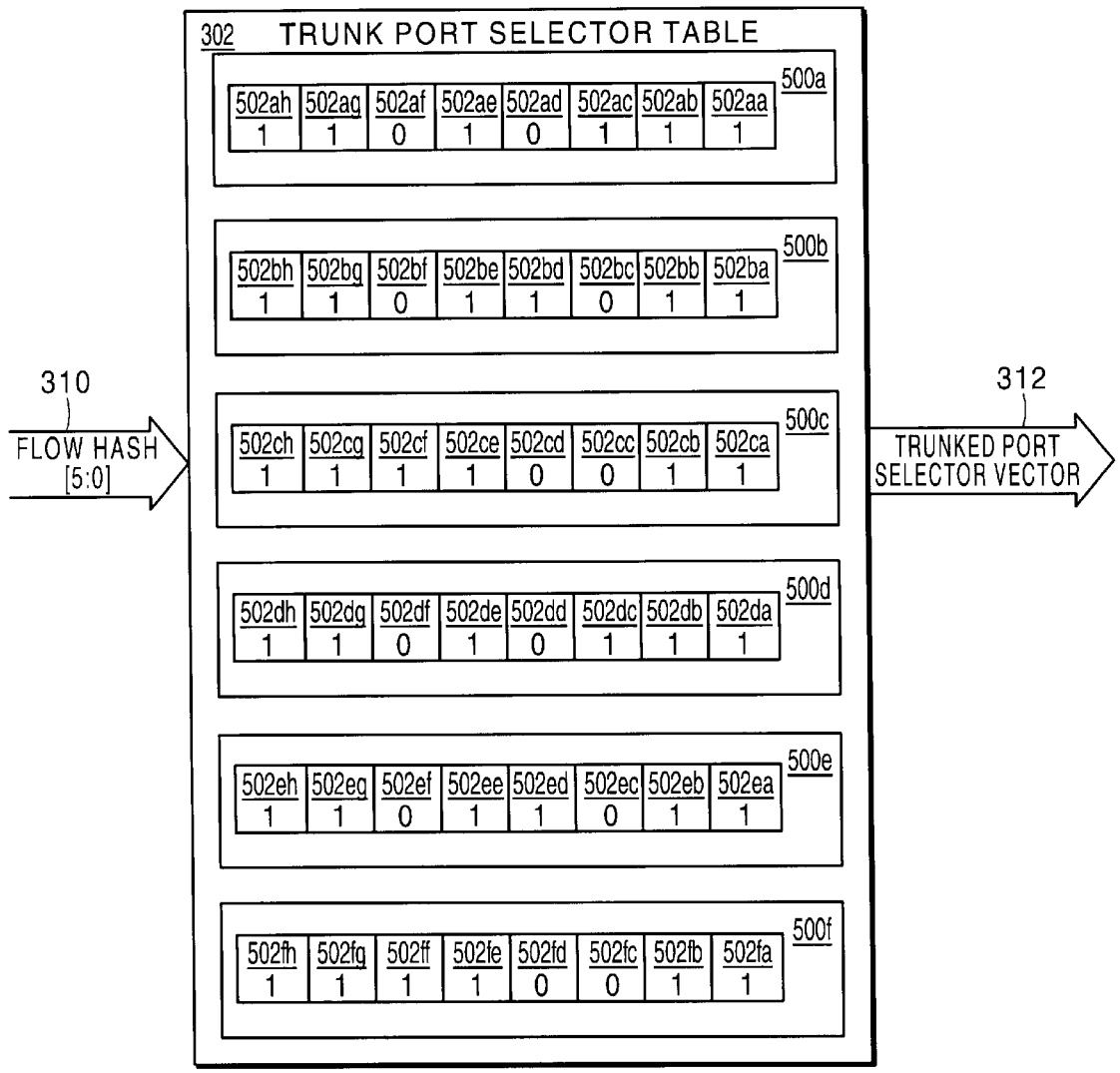
FIG. 5 illustrates the trunk port selector table shown in FIG. 3.

FIG. 5 illustrates the trunk port selector table 302 shown in FIG. 3. The trunk port selector table 302 includes a plurality of trunk port selector table entries 500*a–f*. Six trunk port selector table entries 500*a–f* are shown in FIG. 5. The six flow hash bits 210 is an index to the sixty-four trunk port selector table entries, including 500*a–f*, stored in the trunk port selector table 302. Each trunk port selector table entry 500*a–h* includes a respective egress port bit 502*a–h* for each egress port 136*a–h* in the switch 100 (FIG. 1B).

Trunk port selector table entry 500*a* has eight egress port bits 502*aa–ah*; that is, an egress port bit 502*aa–ah*, for each egress port 136*a–h* (FIG. 1B) in the switch 100 (FIG. 1B). The invention is not limited to a switch with eight egress ports 136*a–h* (FIG. 1B), any number of egress ports 136 (FIG. 1B) may be supported by providing one egress port bit for each egress port in a trunk port selector table entry 500*a–h*. The state of the egress port bit 502 in the trunk port selector table entry 500 determines whether a data packet can be forwarded to the respective egress port 136*a–h* (FIG. 1B). In the embodiment shown in FIG. 5, a data packet may be forwarded to the egress port 136*a–h* (FIG. 1B) if the respective egress port bit 502 in the trunk port selector table entry 500*a* is '1'. In an alternative embodiment, a data packet may be forwarded to the egress port 136*a–h* (FIG. 1B) if the respective egress port bit 502 in the trunk port selector table entry 500*a* is '0'.

Egress port bits 502*ac*, 502*ad* and 502*af* associated with egress ports 136*c*, 136*d*, 136*f* (FIG. 1B) are members of trunk group 134 (FIG. 1B). In each trunk port selector table entry 500, one of the members of the trunk group 134 (FIG. 1B) is enabled with the respective egress port bit 502 set to '1'. In trunk port selector table entry 500*a* egress port bit 502*ac* is '1' to enable egress port 2 136*c* (FIG. 1B) in the logical link 134 (FIG. 1B). In trunk port selector table entry 500*b*, egress port bit 502*bd* is '1' to enable egress port 3 136*d* (FIG. 1B) in the logical link 134 (FIG. 1B). In the embodiment shown in FIG. 5, egress port 5 136*f* (FIG. 1B) is enabled in trunk port selector table entry 500*c*, egress port 2 136*c* (FIG. 1B) is enabled in trunk port selector table entry 500*d*, egress port 3 136*d* (FIG. 1B) is enabled in trunk port selector table entry 500*e* and egress port 5 136*f* (FIG. 1B) is enabled in trunk port selector table entry 500*f*.

The distribution of the port selector table entries 500 in the port selector table determines the number of data packets forwarded through each of the physical links in a logical link. If all physical links transmit data packets at the same speed, data packets may be evenly distributed, dependent on the number of port selector table entries 500 enabling each of the physical links in the logical link.

Alternatively, a greater percentage of the data packets may be forwarded on a particular physical link in the logical link dependent on the number of port selector entries 500 enabling the physical link in the logical link. A greater percentage of data packets for a destination connected to a switch by a logical link may be forwarded on a physical link which is faster than the other physical links in the logical link.

For example, if physical link 132c is 1G bits per second link and physical links 132d–e are 100 Mbits per second links, the port selector table entries 500 stored in the trunk port selector table 302 may be generated such that 80% of the data packets are forwarded on physical link 132c and 10% on each of physical links 132d–e.

Thus, the proportion of data packets transmitted on a particular physical link in a logical link is dependent on the distribution of port selector table entries 500 in the port selector table 302.

Figure 6:
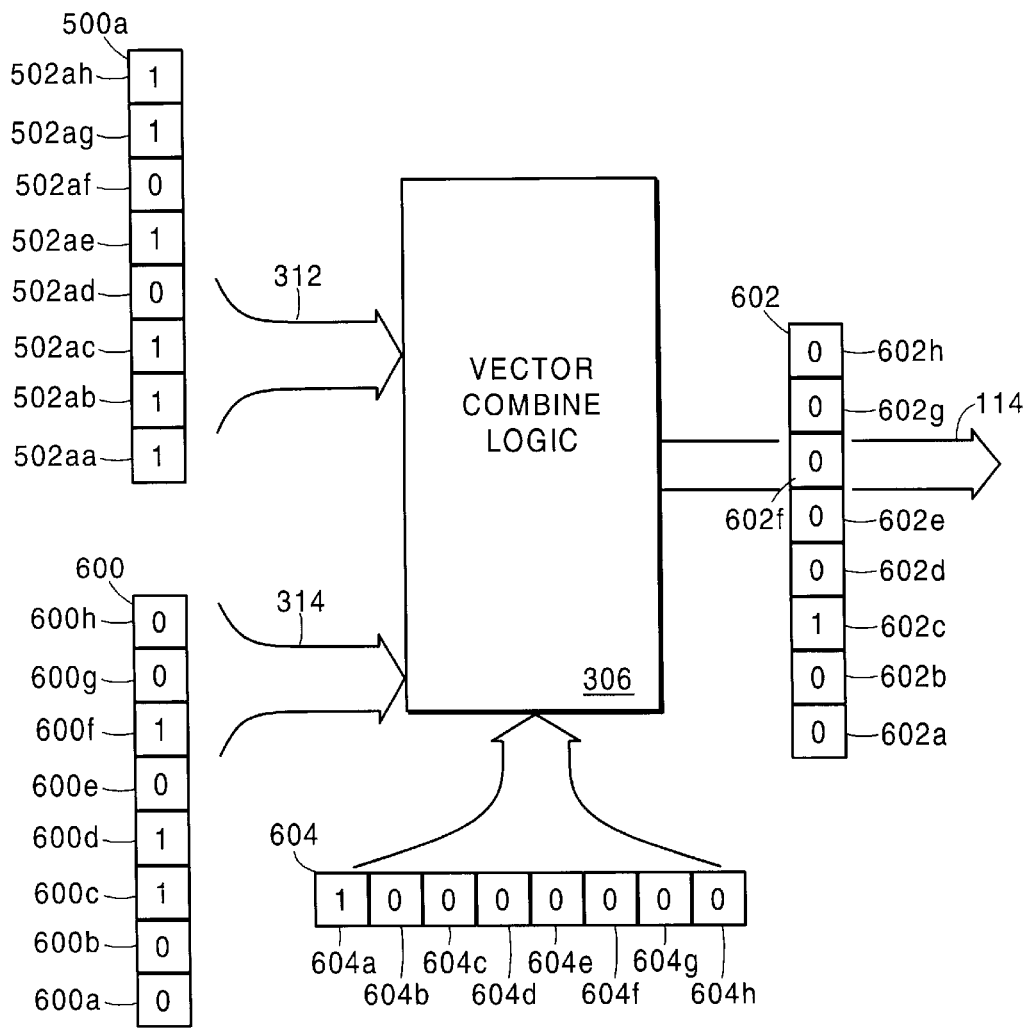
FIG. 6 illustrates the combination of one of the trunk port selector entries shown in FIG. 5, a group membership table vector entry and a logical port forward vector entry.

FIG. 6 illustrates the combination of one of the trunk port selector entries 500 shown in FIG. 5, a logical port forward vector entry 600, and a trunk group membership vector entry 604 for a data packet received from source port 102a (FIG. 1) for destination 112c (FIG. 1). Trunk port selector entry 500a is forwarded on trunk port selector vector 312 to vector combine logic 306. Logical port forward vector entry 600 is forwarded on logical port forward vector 314 to vector combine logic 306. Trunk group membership vector entry 604 is forwarded on trunk group membership vector 320 to vector combine logic 306.

The trunk group membership vector entry 604 is the vector selected for source port 102a (FIG. 1). Source port 102a (FIG. 1) is connected to ingress port 0 138a which in this example, is a single physical link. Thus, bit 604a is set '1' indicating the port to which source port 102a is connected.

Logical port forward vector entry 600 has bits 600f, 600d, 600c set to '1' to enable data packets to be forwarded to egress ports 136c, 136d, 136f (FIG. 1B); that is, all the egress ports 136 in the logic link 134. All other bits 600g, 600h, 600e, 600a, 600b are '0' disabling forwarding of data packets to the respective egress ports 136 (FIG. 1B). Trunk port selector entry 500a has bit 502ac set '1' to select egress port 2 136c (FIG. 1B).

The vector combine logic 306 inverts the trunk group membership vector entry 604 and performs a bit-wise logical AND function to combine the trunk port selector entry 500a, and the inverted trunk group membership vector entry 604. The forward vector entry 602 resulting from the combination has bit 602c set to '1' enabling data packets for the data flow to be forwarded to egress port_2 136c (FIG. 1B).

The trunk group membership vector 604 is inverted in order to provide echo suppression support, that is, by disabling forwarding of a data packet on a logical link if the data packet was received on the logical link. For example, a data packet received on ingress port 2 138c is not forwarded on egress port 5 136f because ingress port 2 138c and egress port 5 136f are members of the same logical link 134.

Thus the logical port forward vector 314 enables all egress ports in the logical link 134 (FIG. 1B) and the trunk port selector vector 312 selects one of the physical links in the logical link 134 (FIG. 1B). The vector combine logic 306 generates the forward vector 114 by combining the trunk port selector vector 312, the trunk group membership vector 320 and the logical port forward vector 314.

Figure 7:
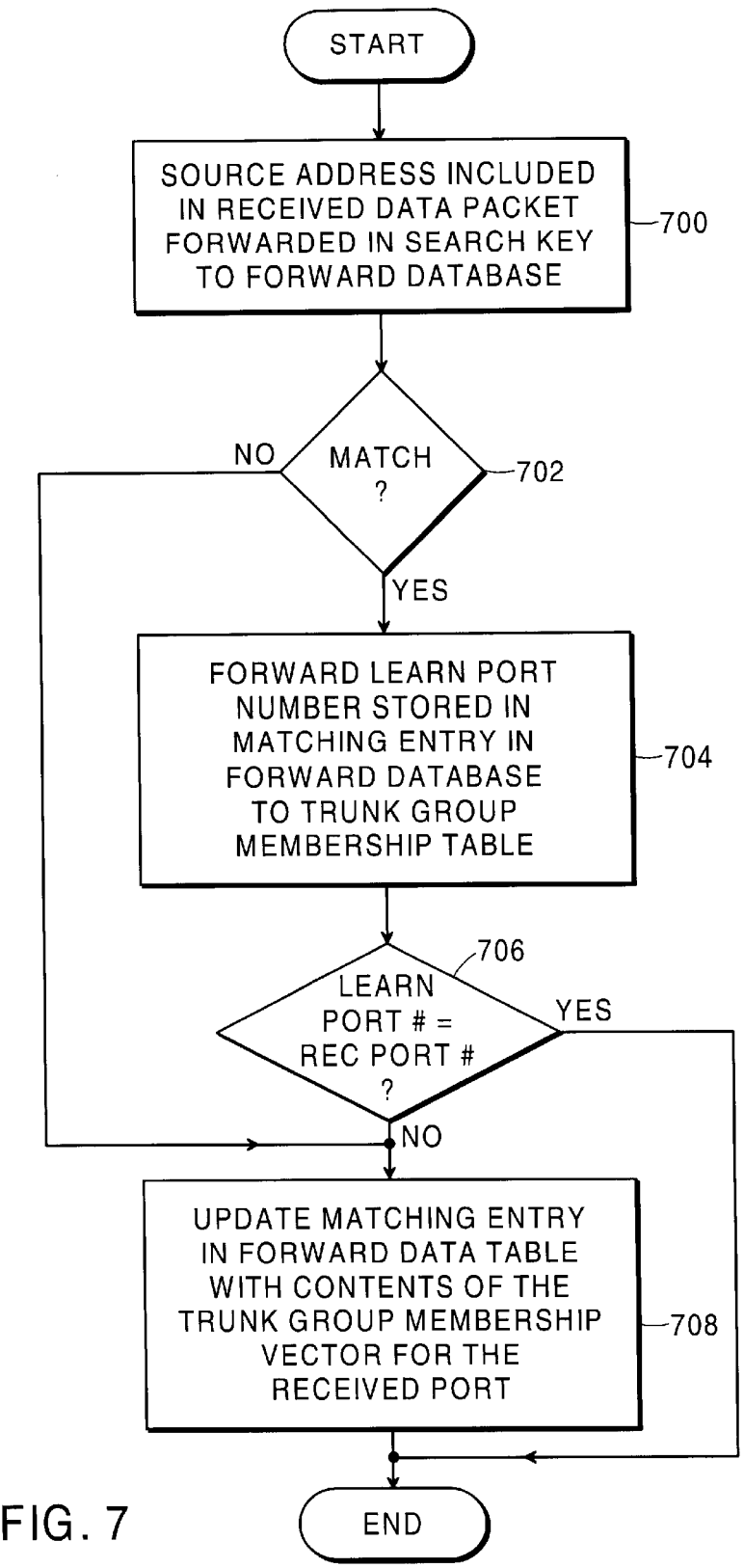
FIG. 7 is a flow diagram of the steps for using the contents of a trunk group membership vector to update a logical port forward vector stored in the forward database 304.

FIG. 7 is a flow diagram of the steps for using the contents of a trunk group membership vector 320 to modify a logical port forward vector 314 stored in the forward database 304. The steps are described in conjunction with the block diagram shown in FIG. 3

At step 700, a search key 316 including a source address included in a received data packet is forwarded to the forward data base. Also, the ingress port number 322 at which the received data packet was received is forwarded to the trunk group membership table 318. Processing continues with step 702.

At step 702, the forward database determines if there is an entry corresponding to the search key 316. If so, processing continues with step 704. If not, processing continues with step 708.

At step 704, the learn port number 324 stored at the forward database entry corresponding to the search key 316 is forwarded to the trunk group membership table 318. The learn port number 324 is the ingress port at which the source address included in the received data packet was learned. Processing continues with step 706.

At step 706, the trunk group membership table 318 checks to see if the bit corresponding to the learn port number 324 is set to '1' in the trunk group membership vector 320 for source port number 322. If so, processing is complete because the received data packet was not received on a new port. If not, processing continues with step 708.

At step 708, the received data packet arrived on an ingress port other than the ingress port on which it was first learned or it is the first time that a data packet has been received from the source address. Thus, the logical port forward vector 314 may need to be updated with the ingress port number 322 and any other ports which are members of the same trunk group as the ingress port number 322. The trunk group membership vector 320 corresponding to the ingress port number 322 is forwarded on update 326 so that the forward database 304 can modify or refresh the logical port forward vector 314 corresponding to the source address. Processing is complete.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch comprising:
   a logical link connecting a destination to the switch, the logical link comprising a plurality of physical links connected to a plurality of ports in the switch;
   flow hash logic which selects a flow hash for a received data packet dependent on the result of a function performed on a destination address and a source address included in the received data packet, the destination address and source address selected dependent on the contents of a type field in a data link header; and trunk port selector logic which selects a trunk port entry dependent on the flow hash, the trunk port entry providing one of the plurality of physical links on which to forward the received data to the destination.

2. A switch as claimed in claim 1 wherein the plurality of ports are randomly selected from the available ports in the switch.

3. A switch as claimed in claim 1 wherein the destination address is an ethernet destination address and the source address is an ethernet source address.

4. A switch as claimed in claim 1 wherein the destination address is an IP destination address and the source address is an IP source address.

5. A switch as claimed in claim 1 wherein the destination address is a TCP destination port address and the source address is a TCP source port address.

6. A switch as claimed in claim 1 wherein the destination address is a UDP destination port address and the source address is a UDP source port address.

7. The switch of claim 1, wherein data packets for a same flow from the source address to the destination address are forwarded on a same physical link through a same egress port.

8. A switch comprising
a logical link connecting a destination to the switch, the logical link comprising a plurality of physical links connected to a plurality of ports in the switch;
flow hash logic which indexes a flow hash for received data dependent on a destination address and a source address included in the received data packet;
trunk port selector logic which selects a trunk port entry dependent on the flow hash, the trunk port entry providing one of the plurality of physical links on which to forward the received data to the destination; and
vector combine logic which selects a port in the switch to forward the received data on one of the physical links in the logical link, dependent on a combination of a logical port forward vector and the trunk port entry.

9. A switch as claimed in claim 8 wherein the vector combine logic selects a port dependent on a trunk group membership vector.

10. A switch as claimed in claim 9 wherein the port is not selected if the received data was received on any one of the physical links in the logical link.

11. A switch comprising:
a logical link connecting a destination to the switch, the logical link comprising a plurality of physical links connected to a plurality of ports;
means for selecting a flow hash for a received data packet dependent on the result of a function performed on a destination address and a source address included in the received data packet, the destination address and the source address selected dependent on the contents of a type field in a data link header; and
means for selecting a trunk port entry dependent on the flow hash, the trunk port entry selecting one of the plurality of physical links on which to forward the received data to the destination.

12. A switch as claimed in claim 11 wherein the plurality of ports are randomly selected from the available ports in the switch.

13. A switch as claimed in claim 11 wherein the destination address is an ethernet destination address and the source address is an ethernet source address.

14. A switch as claimed in claim 11 wherein the destination address is an IP destination address and the source address is an IP source address.

15. A switch as claimed in claim 11 wherein the destination address is a TCP destination port address and the source address is a TCP source port address.

16. A switch as claimed in claim 11 wherein the destination address is a UDP destination port address and the source address is a UDP source port address.

17. The switch of claim 11, wherein data packets for a same flow from the source address to the destination address are forwarded on a same physical link through a same egress port.

18. A switch comprising:
a logical link connecting a destination to the switch, the logical link comprising a plurality of physical links connected to a plurality of ports;
means for selecting a flow hash for received data dependent on a destination address and a source address included in the received data;
means for selecting a trunk port entry dependent on the flow hash, the trunk port entry selecting one of the plurality of physical links on which to forward the received data to the destination; and
means for selecting a port to forward the received data on one of the physical links in the logical link, dependent on a logical port forward vector and the trunk port entry.

19. A switch as claimed in claim 18 wherein the vector combine logic selects a port dependent on a trunk group membership vector.

20. A switch as claimed in claim 19 wherein the port is not selected if the received data was received on any one of the physical links in the logical link.

21. A method for forwarding received data through a switch comprising the steps of:
providing a logical link connecting a destination to the switch, the logical link comprising a plurality of physical links connected to a plurality of ports;
selecting by flow hash logic, a flow hash for the received data packet dependent on the result of a function performed on a destination address and a source address included in the received data, the destination address and the source address selected dependent on the contents of a type field in a data link header;
selecting, by trunk port selector logic, a trunk port entry dependent on the flow hash; and
providing by the trunk port entry, one of the plurality of physical links on which to forward the received data to the destination.

22. A method as claimed in claim 21 wherein the plurality of ports are randomly selected from the available ports in the switch.

23. A method as claimed in claim 21 wherein the destination address is an ethernet destination address and the source address is an ethernet source address.

24. A method as claimed in claim 21 wherein the destination address is an IP destination address and the source address is an IP source address.

25. A method as claimed in claim 21 wherein the destination address is a TCP destination port address and the source address is a TCP source port address.

26. A method as claimed in claim 21 wherein the destination address is a UDP destination port address and the source address is a UDP source port address.

27. The method of claim 21, wherein data packets for a same flow from the source address to the destination address are forwarded on a same physical link through a same egress port.

28. A method comprising the steps of:

providing a logical link connecting a destination to the switch, the logical link comprising a plurality of physical links connected to a plurality of ports;

selecting by flow hash logic, a flow hash for the received data dependent on a destination address and a source address included in the received data;

selecting, by trunk port selector logic, a trunk port entry dependent on the flow hash;

providing by the trunk port entry one of the plurality of physical links on which to forward the received data to the destination; and selecting, by vector combine logic a port in the switch to forward the received data on one of the physical links in the logical link dependent on a combination of a logical port forward vector and the trunk port entry.

29. A switch as claimed in claim 28 wherein the vector combine logic selects a port dependent on a trunk membership vector.

30. A switch as claimed in claim 29 wherein if the port is not selected if the received data was received on any one of the physical links in the logical link.

31. A data network switch comprising:

flow hash logic which generates a flow hash dependent on source and destination information included in data received by the switch;

a forward database for storing logical port forward vectors, each logical port forward vector including forwarding information;

a trunk group membership table for storing trunk group membership vectors, each trunk group membership vector indicating which ports belong to a trunk group; and vector combine logic which combines the logical port forward vector, the trunk port select vector and the trunk group membership vector to select a single port on which to forward to the received data.

32. A data network switch as claimed in claim 31 wherein the vector combine logic selects the single port dependent on the trunk group membership vector associated with the port on which the data was received.

33. A switch as claimed in claim 32 wherein the single port is not selected if the received data was received on the single port or on any other members of the trunk group to which the single port belongs.

34. A switch as claimed in claim 31 wherein a trunk group membership vector is used to modify a corresponding logical port forward vector.

35. A switch as claimed in claim 31 wherein the trunk group membership vector is used to add a logical port forward vector to the forward database.

36. The data switch of claim 31, wherein data packets for a same flow from the source address to the destination address are forwarded on a same physical link through a same egress port.

* * * * *